United States Patent
Park et al.

(10) Patent No.: US 9,467,933 B2
(45) Date of Patent: Oct. 11, 2016

(54) DEVICE AND METHOD FOR ACTIVE SCANNING

(71) Applicant: LG ELECTRONICS INC., Seoul (KR)

(72) Inventors: Giwon Park, Anyang-si (KR); Jinsam Kwak, Anyang-si (KR); Kiseon Ryu, Anyang-si (KR); Jaehyung Song, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,894

(22) PCT Filed: Feb. 26, 2013

(86) PCT No.: PCT/KR2013/001526
§ 371 (c)(1),
(2) Date: Aug. 25, 2014

(87) PCT Pub. No.: WO2013/129818
PCT Pub. Date: Sep. 6, 2013

(65) Prior Publication Data
US 2015/0016303 A1    Jan. 15, 2015

Related U.S. Application Data

(60) Provisional application No. 61/605,767, filed on Mar. 2, 2012, provisional application No. 61/609,897, filed on Mar. 12, 2012.

(51) Int. Cl.
*H04W 36/00*    (2009.01)
*H04W 48/16*    (2009.01)
*H04W 48/14*    (2009.01)
*H04W 84/12*    (2009.01)

(52) U.S. Cl.
CPC ............. *H04W 48/16* (2013.01); *H04W 48/14* (2013.01); *H04W 84/12* (2013.01)

(58) Field of Classification Search
None
See application file for complete search history.

(56) References Cited

U.S. PATENT DOCUMENTS

2006/0165024 A1* 7/2006 Iwami ................... H04W 48/08
370/315

(Continued)

OTHER PUBLICATIONS

Kneckt, et al., "Scanning with FILS," doc.: IEEE 802.11-yy/xxxxr0, Jan. 2012, 14 pages.
Lee, et al., "Probe Response frame transmission interval," doc.: IEEE 802.11-12/0061r1, Jan. 2012, 12 pages.
Song, et al., "Link adaptation in active scanning," doc.: IEEE 802.11-12/0070r1, Jan. 2012, 9 pages.

(Continued)

*Primary Examiner* — Mark Rinehart
*Assistant Examiner* — Angel Brockman
(74) *Attorney, Agent, or Firm* — Lee, Hong, Degerman, Kang & Walmey; Jonathan Kang; Michael Monaco

(57) ABSTRACT

A device and method for active scanning are disclosed. The active scanning method in a wireless LAN can comprise the steps of: allowing an AP to receive a probe request frame containing an the AP identifier; determining whether the AP is a target AP or a non-target AP on the basis of the AP identifier; and performing back-off for the transmission of a probe response frame from a second interval after a first interval is terminated in a minimum channel interval when the AP is a non-target AP. Therefore, the present invention can prevent probe response frames from flooding a STA in a short period of time by distributing intervals in which probe response frames are received to the STA. In addition, the time used by the STA to perform active scanning can be reduced.

10 Claims, 12 Drawing Sheets

(56) References Cited

U.S. PATENT DOCUMENTS

| | | | | |
|---|---|---|---|---|
| 2007/0201377 | A1* | 8/2007 | Santhanam | H04W 74/0866 370/252 |
| 2009/0190553 | A1* | 7/2009 | Masuda | H04W 8/005 370/331 |
| 2013/0301541 | A1* | 11/2013 | Mukherjee | H04W 74/0833 370/329 |

OTHER PUBLICATIONS

Emmelmann, et al., "Active Scanning Improvement," doc.: IEEE 802.11-11/1232r4, Sep. 2011, 19 pages.

PCT International Application No. PCT/KR2013/001526, Written Opinion of the International Searching Authority dated Jun. 26, 2013, 1 page.

* cited by examiner

FIG. 1
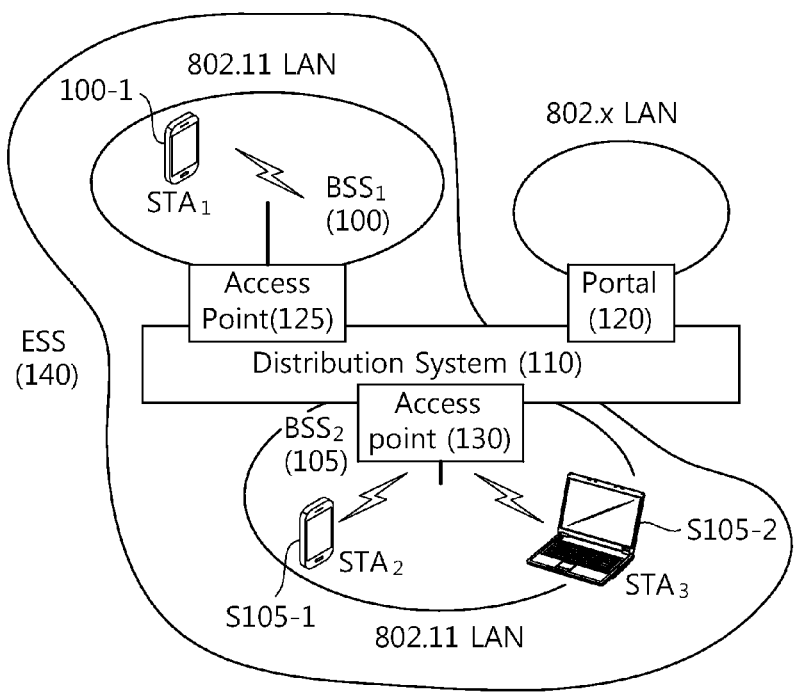
(A)
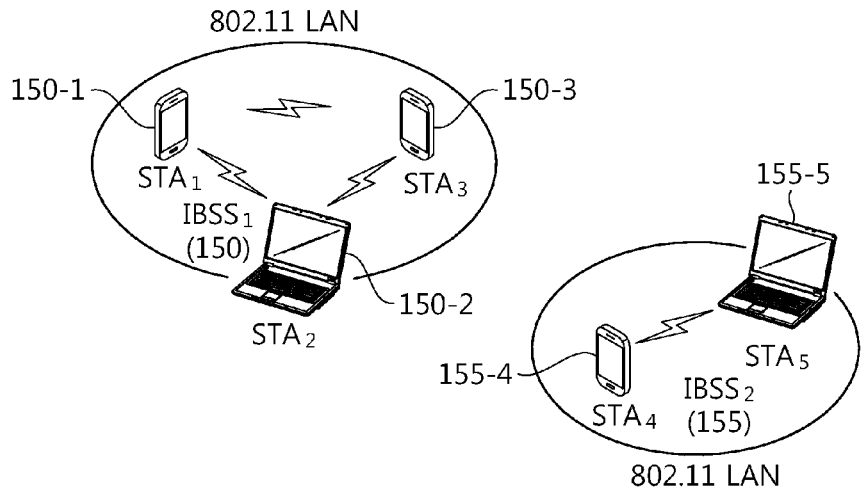
(B)

FIG. 3
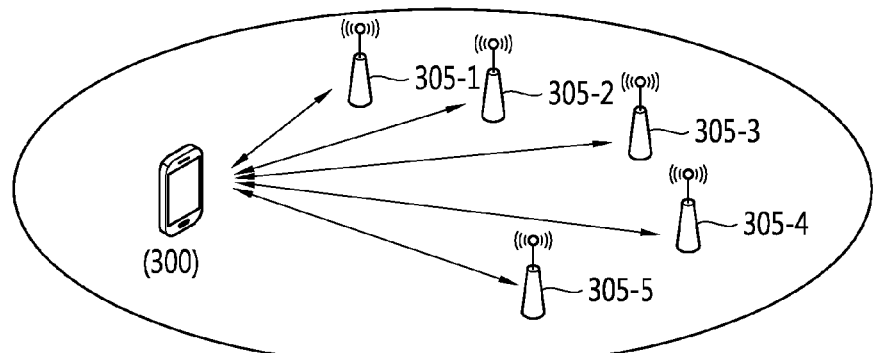
probe request frame (310)
(wildcard, SSID, wildcard BSSID)
(A)
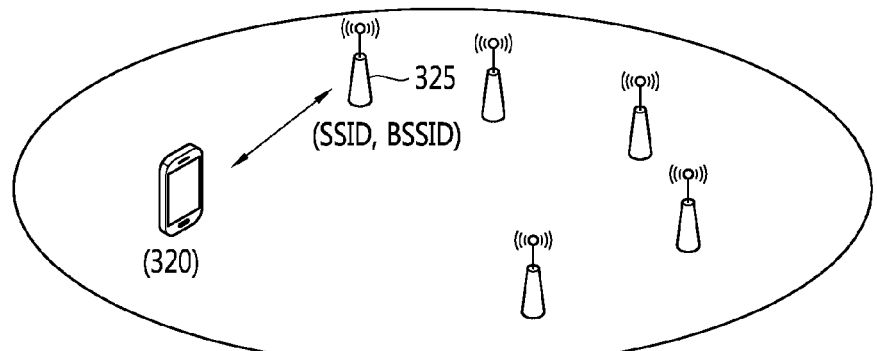
probe request frame (330)
(SSID, BSSID)
(B)
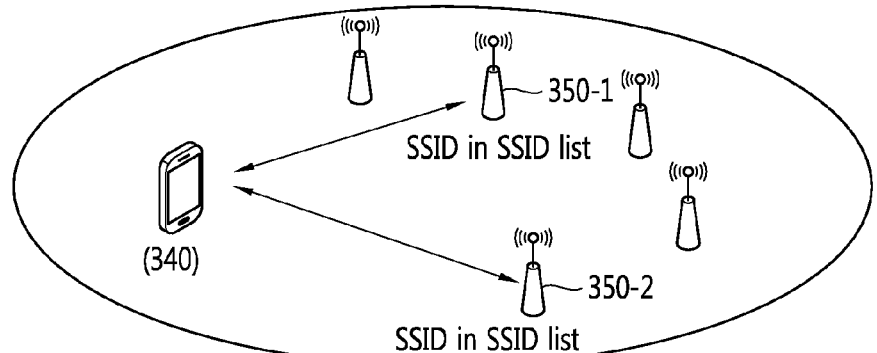
probe request frame (360)
(SSID, wildcard BSSID)
(C)

FIG. 9
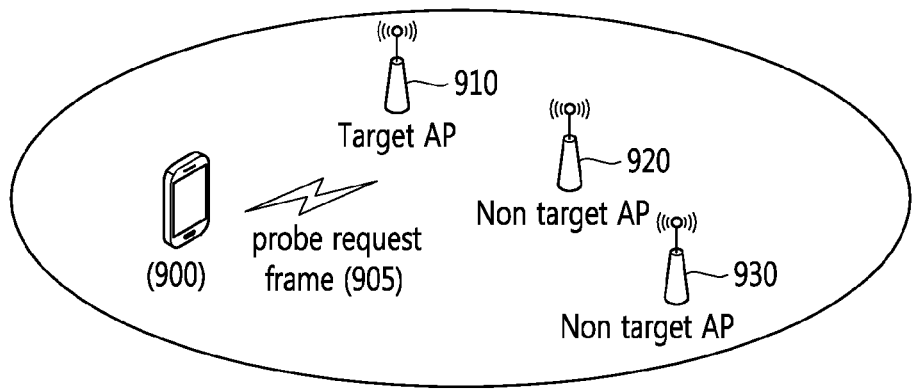
(A)
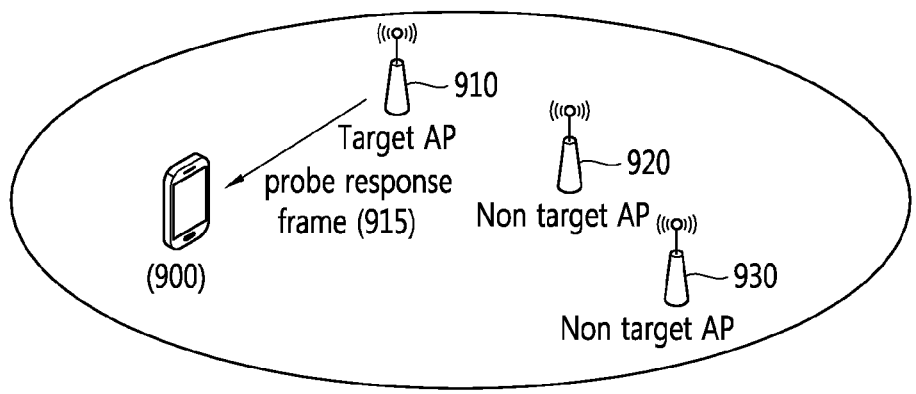
(B)
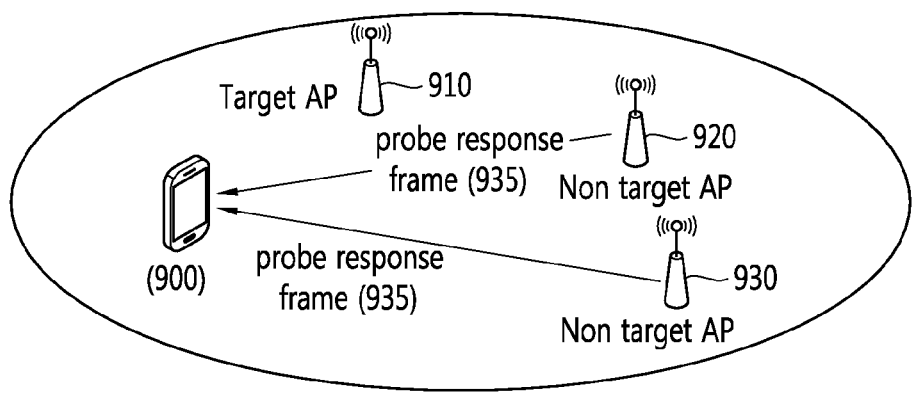
(C)

DEVICE AND METHOD FOR ACTIVE SCANNING

CROSS-REFERENCE TO RELATED APPLICATIONS

This application is the National Stage filing under 35 U.S.C. 371 of International Application No. PCT/KR2013/001526, filed on Feb. 26, 2013, which claims the benefit of U.S. Provisional Application Ser. Nos. 61/605,767, filed on Mar. 2, 2012 and 61/609,897, filed on Mar. 12, 2012, the contents of which are all hereby incorporated by reference herein in their entirety.

BACKGROUND OF THE INVENTION

1. Field of the Invention

The present invention relates to the scanning method and apparatus of a station (STA) and, more particularly, to a method and an apparatus for performing active scanning by an STA.

2. Related Art

A recent Wireless LAN (WLAN) technology is basically evolving into three directions. There are Institute of Electrical and Electronic Engineers (IEEE) 802.11ac and IEEE 802.11ad as efforts to further increase the transfer rate on the extension line of the existing WLAN evolution direction. IEEE 802.11ad is a WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af that uses a TV White Space (TVWS) band and IEEE 802.11ah that uses a 900 MHz band. A main object of the wide-area WLANs is to extend extended range Wi-Fi services as well as the smart grid and a wide-area sensor network. Furthermore, the existing WLAN Medium Access Control (MAC) technology is problematic in that an initial link setup time is very long according to circumstances. In order to solve such a problem and in order for an STA to rapidly access an AP, IEEE 802.11ai standardization is recently in progress actively.

IEEE 802.11ai is a MAC technology for handling a rapid authentication procedure in order to significantly reduce the initial setup and association time of a WLAN. Standardization activities for IEEE 802.11ai have been started as a formal task group on January, 2011. In IEEE 802.11ai, in order to enable a rapid access procedure, a discussion on the simplification of procedures in such fields AP discovery, network discovery, Time Synchronization Function (TSF) synchronization, authentication & association, and a procedure convergence with a higher layer is in progress. From among them, ideas, such as procedure convergence using the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide the active scanning method of a station (STA).

Another object of the present invention is to provide an apparatus for performing the active scanning method of a station (STA).

An active scanning method in a WLAN according to an aspect of the present invention for achieving the aforementioned object of the present invention may includes the steps of receiving, by an Access Point (AP), a probe request frame comprising an AP identifier, determining whether or not the AP is a target AP or a non-target AP based on the AP identifier, and performing back-off for the transmission of a probe response frame from a second interval after a first interval of a minimum channel interval expires if the AP is the non-target AP, wherein the AP may be the target AP if the AP identifier is indicative of the AP, the AP may be the non-target AP if the AP identifier is not indicative of the AP, the minimum channel interval may be a minimum time used to scan each channel, and the minimum channel interval may include the first interval and the second interval. A step of performing the back-off for the transmission of the probe response frame in the first interval if the AP is the target AP may be further include. The probe request frame may include a first interval use field indicative of whether the first interval is used or not. The probe request frame further may include at least one first interval time field comprising information about a period assigned as the first interval. The step of performing the back-off for the transmission of the probe response frame from the second interval after the first interval of the minimum channel interval expires if the AP is the non-target AP may include overhearing whether or not the probe response frame is transmitted by the target AP during the first interval if the AP is the non-target AP and sending the probe response frame during the second interval if whether or not the probe response frame is transmitted by the target AP is not overheard during the first interval. Information about the AP identifier may be at least one of at least one Basic Service Set IDentification (BSSID), at least one Service Set IDentification (SSID), a mesh ID, a Homogeneous Extended Service Set IDentifier (HESSID), and a network ID.

An AP for performing active scanning in a WLAN according to another aspect of the present invention for achieving the aforementioned object of the present invention may includes a processor. The processor may be configured to determine whether or not an AP is a target AP or a non-target AP based on an AP identifier included in a received probe request frame and to perform back-off for the transmission of a probe response frame from a second interval after a first interval of a minimum channel interval expires if the AP is the non-target AP. The AP may be the target AP if the AP identifier is indicative of the AP. The AP may be the non-target AP if the AP identifier is not indicative of the AP. The minimum channel interval may be a minimum time used to scan each channel, and the minimum channel interval may include the first interval and the second interval. The processor may be configured to perform the back-off for the transmission of the probe response frame in the first interval if the AP is the target AP. The probe request frame may include a first interval use field indicative of whether the first interval is used or not. The probe request frame further may include at least one first interval time field comprising information about a period assigned as the first interval. The processor may be configured to overhear whether or not the probe response frame is transmitted by the target AP during the first interval if the AP is the non-target AP and to send the probe response frame during the second interval if whether or not the probe response frame is transmitted by the target AP is not overheard during the first interval. Information about the AP identifier may be at least one of at least one Basic Service Set IDentification (BSSID), at least one Service Set IDentification (SSID), a mesh ID, a Homogeneous Extended Service Set IDentifier (HESSID), and a network ID.

A phenomenon in which probe response frames are crowded within a short time is prevented by distributing an interval in which the probe response frames received by a station (STA). Furthermore, the time that is taken for an STA to perform active scanning can be reduced.

BRIEF DESCRIPTION OF THE DRAWINGS

FIG. 1 is a conceptual diagram illustrating the configuration of a Wireless Local Area Network (WLAN);

FIG. 3 is a conceptual diagram illustrating a method of sending a probe request frame;

FIG. 9 is a conceptual diagram illustrating an active scanning method in accordance with an embodiment of the present invention;

DESCRIPTION OF EXEMPLARY EMBODIMENTS

FIG. 1 is a conceptual diagram illustrating the configuration of a Wireless Local Area Network (WLAN).

FIG. 1(A) illustrates the configuration of an infrastructure network according to Institute of Electrical and Electronic Engineers (IEEE) 802.11.

Referring to FIG. 1(A), the WLAN system may include one or more Basic Service Sets (BSSs) 100 and 105. Each of the BSSs 100 and 105 is a set of an AP and an STA, such as an Access Point (AP) 125 and a Station STA1 100-1 that are successfully synchronized with each other and are capable of communicating with each other. The BSS is not a concept indicative of a specific area. The BSS 105 may include one or more STAs 105-1 and 105-2 that may be associated with a single AP 130.

An infrastructure BSS may include at least one STA, the APs 125 and 130 providing distribution service, and a Distribution Systems (DS) 110 coupling a plurality of APs.

The DS 110 may implement an Extended Service Set (ESS) 140 by coupling some BSSs 100 and 105 together. The ESS 140 may be used as a term indicative of a single network over which one or more APs 125 and 230 are connected through the DS 110. APs included in a single ESS 140 may have the same Service Set IDentification (SSID).

A portal 120 may function as a bridge for performing connection between a WLAN network (i.e., IEEE 802.11) and another network (e.g., 802.X).

In an infrastructure network, such as that of FIG. 1(A), a network between the APs 125 and 130 and a network between the APs 125 and 130 and the STAs 100-1, 105-1, and 105-2 may be implemented. However, a network may be configured between STAs so that the STAs may perform communication even without the APs 125 and 130. A network configured between STAs so that the STAs may perform communication without the APs 125 and 130 is defined as an Ad-Hoc network or an independent Basic Service Set (BSS).

FIG. 1(B) is a conceptual diagram illustrating an independent BSS.

Referring to FIG. 1(B), the Independent BSS (IBSS) is a BSS that operates in Ad-Hoc mode. The IBSS does not include a centralized management entity because it does not include an AP. That is, in the IBSS, STAs 150-1, 150-2, 150-3, 155-4, and 155-5 are managed in a distributed manner. In the IBSS, all the STAs 150-1, 150-2, 150-3, 155-4, and 155-5 may be mobile STAs, and they form a self-contained network because they cannot access a distribution system.

An STA is a specific function medium, including Medium Access Control (MAC) that complies with the rules of the Institute of Electrical and Electronics Engineers (IEEE) 802.11 standard and a physical layer interface for a radio medium, and may be used as a meaning including both an AP STA and a non-AP STA in a broad sense.

An STA may be called as various names, such as a mobile terminal, a wireless device, a Wireless Transmit/Receive Unit (WTRU), User Equipment (UE), a Mobile Station (MS), a mobile subscriber unit, or simply a user.

Figure 2:
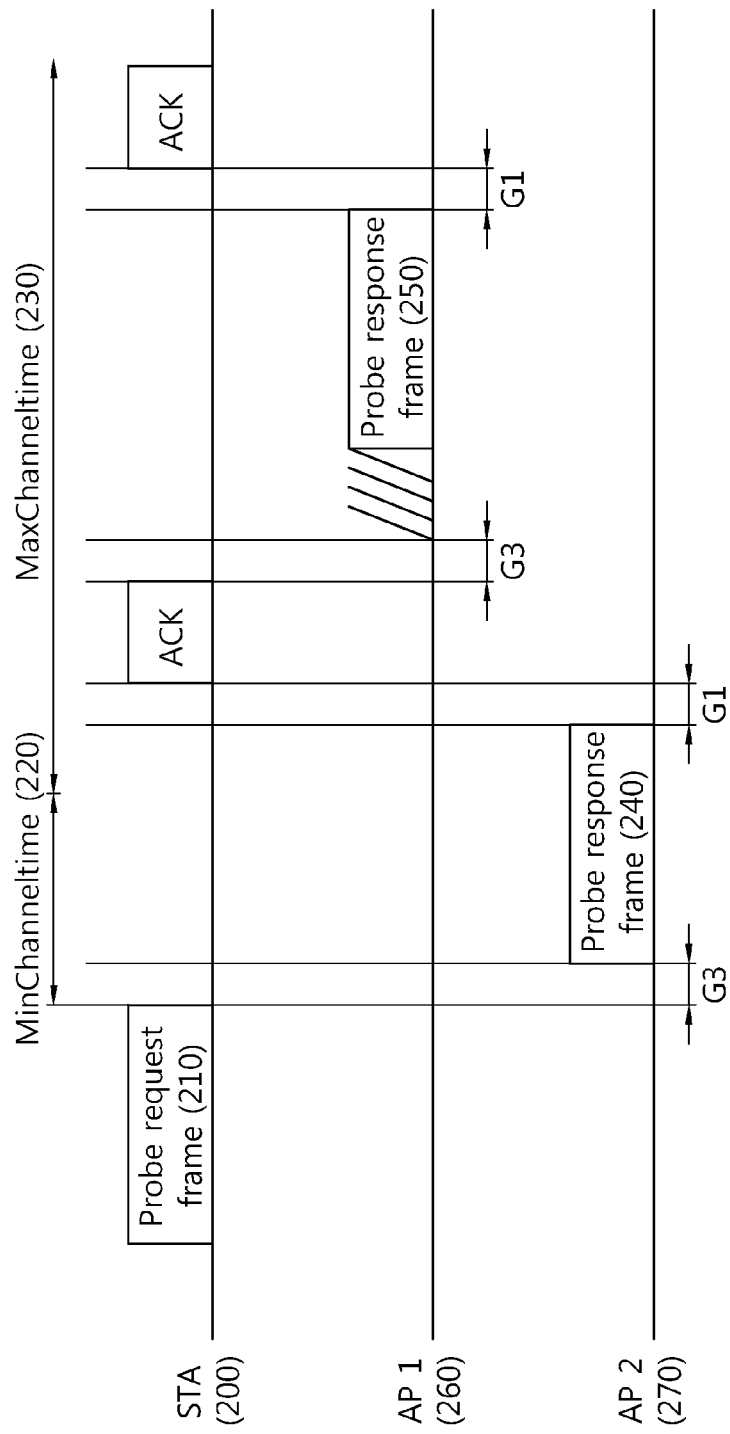
FIG. 2 is a conceptual diagram illustrating an active scanning procedure.

FIG. 2 is a conceptual diagram illustrating an active scanning procedure.

Referring to FIG. 2, the active scanning procedure may be performed in accordance with the following steps.

(1) An STA 200 determines whether it is ready to perform a scanning procedure.

The STA 200 may perform active scanning, for example, after a probe delay time expires or until specific signaling information (e.g., PHY-RXSTART.indication primitive) is received.

The probe delay time is delay generated before a probe request frame 210 is transmitted when the STA 200 performs active scanning. The PHY-RXSTART.indication primitive is a signal transmitted from a physical (PHY) layer to a local Medium Access Control (MAC) layer. The PHY-RXSTART.indication primitive may signal information indicative that a PLCP Protocol Data Unit (PPDU) including a valid PLCP header has been received in a Physical Layer Convergence Protocol (PLCP) to the MAC layer.

(2) The STA 200 performs basic access.

In the 802.11 MAC layer, some STAs may share a radio medium using, for example, a Distributed Coordination Function (DCF) that is a contention-based function. The DCF is an access protocol, and can prevent a collision between STAs through a back-off method using Carrier Sense Multiple Access/Collision Avoidance (CSMA/CA). The STA 200 may send the probe request frame 210 to APs 260 and 270 using a basic access method.

(3) The STA 200 may include information (e.g., information about a Service Set IDentification (SSID) and a Basic Service Set IDentification (BSSID)) for specifying the APs 260 and 270, included in an MLME-SCAN.request primitive, in the probe request frame 210, and may send the probe request frame 210.

The BSSID is an indicator for specifying an AP, and may have a value corresponding to the Medium Access Control (MAC) address of the AP. A Service Set IDentification (SSID) is a network name for specifying an AP that may be read by a person who operates an STA. The BSSID and/or the SSID may be used to specify an AP.

The STA 200 may specify an AP based on information for specifying the APs 260 and 270 included in the MLME-SCAN.request primitive. The specified APs 260 and 270 may send probe response frames 250 and 240 to the STA 200. The STA 200 may include the information about the SSID and the BSSID in the probe request frame 210 and sending the probe request frame 210 by unicasting, multicasting, or broadcasting the probe request frame 210. A method of unicasting, multicasting, or broadcasting the probe request frame 210 using the information about the SSID and the BSSID is additionally described with reference to FIG. 3.

For example, if an SSID list is included in the MLME-SCAN.request primitive, the STA 200 may include the SSID list in the probe request frame 210 and send the probe request frame 210. The APs 260 and 270 may receive the probe request frame 210, may determine an SSID included in the SSID list included in the probe request frame 210, and may determine whether or not to send the probe response frames 240 and 250 to the STA 200.

(4) The STA 200 resets a probe timer to 0 and then drives the probe timer.

The probe timer may be used to check a minimum channel time 'MinChanneltime' 220 and a maximum channel time 'MaxChanneltime' 230. The minimum channel time 220 and the maximum channel time 230 may be used to control the active scanning operation of the STA 200.

The minimum channel time 220 may be used to perform an operation for changing a channel in which the STA 200 performs active scanning. For example, if the STA 200 has not received the probe response frames 240 and 250 until the minimum channel time 220, the STA 200 may change a scanning channel and perform scanning in another channel. If the STA 200 has received the probe response frames 240 and 250 until the minimum channel time 220, the STA 200 may wait until the maximum channel time 230 and process the received probe response frames 240 and 250.

The STA 200 may detect a PHY-CCA.indication primitive until the probe timer reaches the minimum channel time 220, and may determine whether or not the probe response frames 240 and 250 have been received by the STA 200 prior to the minimum channel time 220.

The PHY-CCA.indication primitive includes information about the state of a medium, and may be transmitted from the physical layer to the MAC layer. The PHY-CCA.indication primitive may provide notification of the state of a current channel using a channel state parameter called 'busy' if the channel is not available, and may provide notification of the state of a current channel using a channel state parameter called 'idle' if the channel is not available. If the PHY-CCA.indication is detected as being busy, the STA 200 may determine that the probe response frames 240 and 250 received by the STA 200 are present. If the PHY-CCA.indication is detected as being idle, the STA 200 may determine that the probe response frames 240 and 250 received by the STA 200 are not present.

If the PHY-CCA.indication is detected as being idle, the STA 200 may set a Net Allocation Vector (NAV) to 0 and scan a next channel. If the PHY-CCA.indication is detected as being busy, the STA 200 may perform processing on the probe response frames 240 and 250 received after the probe timer has reached the maximum channel time 230. After processing the received probe response frames 240 and 250, the STA 200 may set a Net Allocation Vector (NAT) to 0 and scan a next channel.

Hereinafter, in an embodiment of the present invention, to determine whether the probe response frames 240 and 250 received by the STA 200 are present or not may include determining the state of a channel using the PHY-CCA.indication primitive.

(5) If all channels included in a channel list 'ChannelList' are scanned, the MLME may signal an MLME-SCAN.confirm primitive. The MLME-SCAN.confirm primitive may include BSSDescriptionSet including all pieces of information that have been obtained in the scanning process.

If the STA 200 uses an active scanning method, the STA 200 needs to perform monitoring for determining whether the parameter PHY-CCA.indication is busy or not until the probe timer reaches a minimum channel time. Accordingly, although a probe response frame has been received from an AP specified through the probe request frame 210 prior to the minimum channel time, there is a problem in that unnecessary channel monitoring continues to be performed until the minimum channel time is reached.

Furthermore, although a probe response frame has been received from a specified AP, unnecessary delay in performing active scanning may occur because processing on a probe request frame received after wait until the probe timer reaches a maximum channel time is performed.

FIG. 3 is a conceptual diagram illustrating a method of sending a probe request frame.

FIG. 3 discloses a method of broadcasting, multicasting, and unicasting a probe request frame.

FIG. 3(A) is a method of broadcasting, by an STA 300, a probe request frame 310.

The STA 300 may include a wildcard SSID and a wildcard BSSID in the probe request frame 310, and may broadcast the probe request frame 310.

The wildcard SSID and the wildcard BSSID may be used as identifiers indicative of all APs 305-1, 305-2, 305-3, 305-4, and 305-5 that are included in the coverage of the STA 300.

If the STA 300 includes the wildcard SSID and the wildcard BSSID in the probe request frame 310 and sends the probe request frame 310, the APs 305-1, 305-2, 305-3, 305-4, 305-5 that have received the probe request frame 310 transmitted by the STA 300 may send probe response frames to the STA 300 in response to the received probe request frame.

If the APs 305-1, 305-2, 305-3, 305-4, and 305-5 that have received the broadcasted probe request frame 310 send the probe response frames to the STA 300 within a specific time in response to the received probe request frame 310, there may be a problem in that the STA 300 has to receive and process too many probe response frames at once.

FIG. 3(B) is a method of unicating, by an STA 320, a probe request frame 330.

Referring to FIG. 3(B), if the STA 320 unicasts the probe request frame 330, the STA 320 may send the probe request frame 330 including information about a specific SSID/BSSID of an AP. The STA 320 may send the probe response frame to only an AP 325 that belongs to APs that have received the probe request frame 330 and that corresponds to a specific SSID/BSSID.

FIG. 3(C) is a method of multicasting, by an STA 340, a probe request frame 360.

Referring to FIG. 3(C), the STA 340 may include an SSID list and a wildcard BSSID in the probe request frame 360 and send the probe request frame 360. APs 350-1 and 350-2 that belong to APs that have received the probe request frame 360 and that correspond to SSIDs included in the SSID list included in the probe request frame may send probe response frames to the STA 340.

When an STA unicasts/multicasts a probe request frame as in FIGS. 3(B) and 3(C), there may be a case where a probe response frame may not be received from an AP corresponding to an SSID that is specified in the probe request frame transmitted by the STA. In such a case, the STA that has not received the probe response frame waits until a minimum channel time, changes a scanning channel to another channel, and performs scanning in another channel. That is, unnecessary delay in performing active scanning may occur because the STA that has not received the probe response frame from the specified AP may change a scanning channel only after it waits until the minimum channel time.

Accordingly, an active scanning method according to an embodiment of the present invention discloses a method of reducing unnecessary delay generated when an STA performs active scanning and rapidly associating the STA with an AP. Furthermore, there is disclosed a method for solving a problem in that an STA receives too many probe response frames in a specific time interval in an existing active scanning method.

Figure 4:
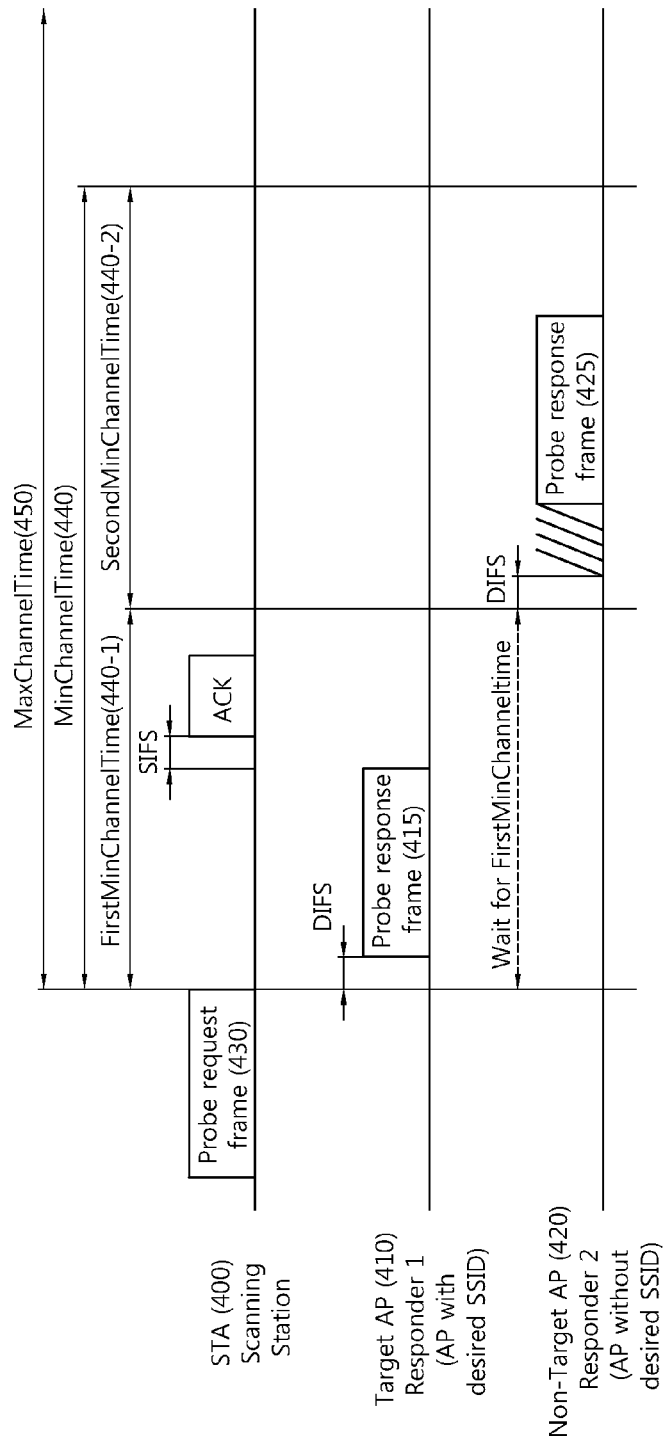
FIG. 4 is a conceptual diagram illustrating an active scanning method in accordance with an embodiment of the present invention.

FIG. 4 is a conceptual diagram illustrating an active scanning method in accordance with an embodiment of the present invention.

FIG. 4 discloses a method of receiving, by an STA 400, a probe response frame from a specified at least one target AP 410 only in a first minimum channel time 440-1, that is, a set time interval, if the STA 400 specifies at least one AP that will send a probe response frame and sends a probe request frame 430 to the specified at least one AP.

Hereinafter, in an embodiment of the present invention, if an STA unicasts or multicasts a probe request frame using information for specifying an AP, such as an SSID, an SSID list, or a BSSID, the specified AP is called a target AP. The remaining APs not specified by the probe request frame are called non-target APs.

Referring to FIG. 4, the STA 400 may specify the target AP 410 that will respond to the transmitted probe request frame 430, and may send the probe request frame 430 to the specified target AP 410. For example, the STA 400 may include information for specifying an AP, such as an SSID or an SSID list, in the probe request frame 430, and may send the probe request frame 430.

The STA 400 may specify the first minimum channel time 440-1 that belongs to a minimum channel time 440 as an interval in which a probe response frame is received from the target AP 410 only, and may use the specified first minimum channel time 440-1. That is, the STA 400 may define some specified interval that belongs to the minimum channel time 440 and in which the probe response frame is received from the target AP as the first minimum channel time 440-1, and may define intervals, belonging to the minimum channel time 440 other than the first minimum channel time 440-1, as a second minimum channel time 440-2.

A first interval, that is, another term, may be used as the same meaning as the first minimum channel time 440-1, and a second interval, that is, another term, may be used as the same meaning as the second minimum channel time 440-2. That is, in an embodiment of the present invention, the terms called the first minimum channel time 440-1 and the second minimum channel time 440-2 are used and described, but the first interval and the second interval may be interpreted as being the same meanings.

The first minimum channel time 440-1 may mean a time interval that is preferentially used for the target AP 410 to send a probe response frame 415 and for the STA 400 to receive the probe response frame 415 from the target AP 410. That is, in the first minimum channel time, the target AP may perform back-off for sending the probe response frame.

In the first minimum channel time 440-1, the STA 400 may receive the probe response frame 415 from only the target AP 410 that has been specified through the probe request frame 430. After the first minimum channel time 440-1, the STA 400 may receive a probe response frame 425 even from a non-target AP 420 that is not specified through the probe request frame 430.

The probe request frame 430 including information about the target AP 410 may be transmitted to the non-target AP 420 in addition to the target AP 410. The probe request frame 430 may include information about the first minimum channel time, for example, information about whether the first minimum channel time is used or not and information about the time that is set as the first minimum channel time.

Figure 5:
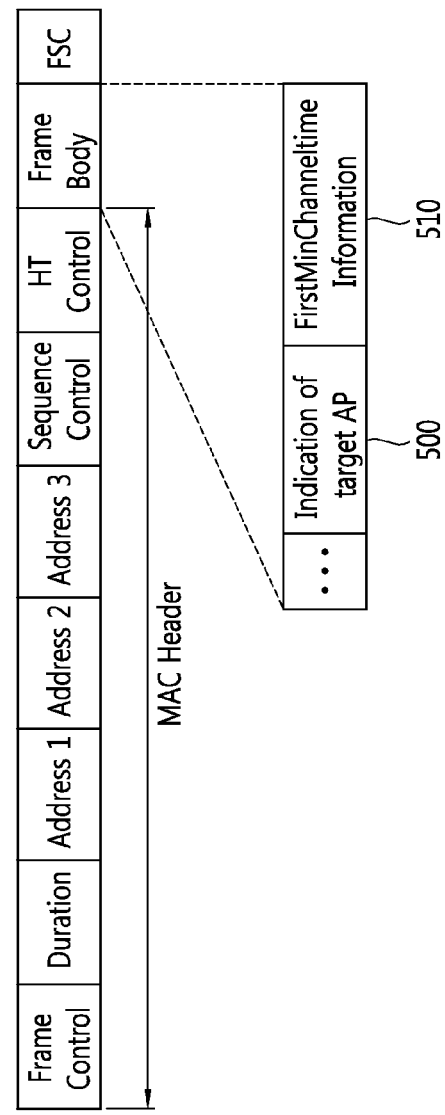
FIG. 5 is a conceptual diagram illustrating a probe request frame in accordance with an embodiment of the present invention.

FIG. 5 is a conceptual diagram illustrating a probe request frame in accordance with an embodiment of the present invention.

Referring to FIG. 5, the probe request frame may include first minimum channel time information field 'FirstMinChannel information field' 510 including information about whether or not a first minimum channel time is used.

For example, the first minimum channel time information field 510 may be assumed to operate on or off as flag information. If the first minimum channel time information field is on, an AP that has received a probe request frame may obtain information indicative that an STA will receive a probe response frame from a target AP using the first minimum channel time. If the first minimum channel time information field is off, an AP that has received a probe request frame may obtain information indicative that an STA does not use the first minimum channel time. If the first minimum channel time is used, the time assigned as the first minimum channel time is a predetermined value, and may have a value smaller than the minimum channel time.

A field including information about whether or not the first minimum channel time (or the first interval) is used may be called a first interval use field.

As another method, the first minimum channel time field 510 may include information about the time assigned as the first minimum channel time. A target AP that has received the probe request frame may send a probe response frame to an STA within the time assigned as a first minimum channel time based on information about the time assigned as the first minimum channel time included in the first minimum channel time field 510. Information about a second minimum channel time may also be included in the probe request frame. That is, the probe request frame may include a field including information about a period (or an interval) that is assigned as a first minimum channel time (or a first interval).

Furthermore, the probe request frame may information for specifying an AP. For example, at least one BSSID, at least one SSID, a mesh ID, a Homogeneous Extended Service Set IDentifier (HESSID), or a network ID (e.g., a roaming consortium ID) may be used as the information for specifying an AP. An STA may specify an AP that will send a probe response frame by including information about at least one AP ID of the IDs in the probe request frame and then sending the probe request frame. Such information about an AP ID may be included in the identifier field of a target AP 'Indication of target AP field' 500 and transmitted.

The names of the fields disclosed in FIG. 5 are arbitrary, and other names may be used. Furthermore, the information included in the field disclosed in FIG. 5 may be transmitted in various information formats in such a manner that the information is included in a field not an independent field and transmitted.

(2) After sending the probe request frame 430, the STA 400 monitors the probe response frame 415 received from the target AP 410 during the first minimum channel time 440-1.

(3) If the STA 400 receives the probe response frame 415 from the target AP 410 within the first minimum channel time 440-1, the STA 400 may be associated with the target AP 410 by performing an authentication and association process along with the target AP 410.

In the case of the existing active scanning method, if the STA 400 receives a probe response frame from an AP within the minimum channel time 440, the STA 400 waits until a maximum channel time 450 is reached and then performs processing on the received probe response frame. Accordingly, unnecessary delay is generated in performing active scanning. If the active scanning method disclosed in the present invention is used, however, the STA 400 may preferentially receive the probe response frame 415 from the target AP 410 in the first minimum channel time 440-1, and may directly perform an authentication and association procedure along with the target AP 410. Accordingly, unnecessary delay generated in active scanning can be reduced because the STA 400 does not need to unnecessarily wait until the maximum channel time 450.

Furthermore, in the case of the existing active scanning method, the availability of a channel was monitored using the PHY-CCA.indication primitive until the minimum channel time 440. In the active scanning method disclosed in the present invention, however, an unnecessary monitoring section can be reduced because a section in which the availability of a channel is monitored using the PHY-CCA.indication primitive is limited to the first minimum channel time 440-1 and monitoring is performed on the channel.

In another embodiment, if a signal received from another AP (e.g., the non-target AP 420) has an SNR better than that received from the target AP 410, in order to select the signal having the better SNR, the STA 400 may wait until the maximum channel time 450 without performing an authentication and association procedure along with the target AP 410, and may process the received probe response frames 415 and 425 after the maximum channel time 450.

If the probe response frame 415 is not received from the target AP 410 within the first minimum channel time 440-1, the STA 400 may change a scanning channel to another channel and perform a scanning procedure. In another method, the STA 400 may additionally determine whether or not the probe response frame 415 transmitted by the non-target AP 420 is received until the minimum channel time 440. An embodiment of the present invention to be described later discloses a method of additionally determining whether or not the probe response frame 425 transmitted by the non-target AP 420 is received until the minimum channel time 440.

If the STA 400 uses a method of receiving the probe response frame 415 from the target AP 410 in the first minimum channel time 440-1, a phenomenon in which probe response frames are simultaneously received within a specific time interval can be prevented and the STA 400 can be rapidly associated with the target AP 410 because the SAT 400 preferentially receives the probe response frame 415 of the target AP 410.

(4) If the STA 400 does not receive the probe response frame 415 from the target AP 410 in the first minimum channel time 440-1, the STA 400 may determine whether or not a probe response frame is received until the minimum channel time 440.

Hereinafter, in an embodiment of the present invention, a time interval in which whether or not a probe response frame is received is determined by determining whether or not the probe response frame is received is determined is called the minimum channel time 440.

The STA 400 may receive the probe response frame 425 from the non-target AP 420 after the first minimum channel time 440-1. If the STA 400 does not receive a probe response frame from the target AP 410 and the non-target AP 420 until the first minimum channel time 440-1, the STA 400 may change a scanning channel to another channel and perform a scanning procedure.

That is, if the second minimum channel time (i.e., the second interval) is started after the first minimum channel time, the non-target AP 420 may perform back-off for sending the probe response frame.

A case where the probe response frame 415 is not received from the target AP 410 in the first minimum channel time 440-1 may be generated, for example, in a case where the STA moves. If an STA is associated with an AP installed by the user of the STA indoors and then moved outdoors, the STA is unaware of information about the AP included in the coverage of the STA. In such a case, if the STA specifies an AP and sends a probe request frame to the specified AP, the STA is unable to receive a probe response frame from the specified AP. Accordingly, the STA may receive a probe response frame from a non-target AP other than a target AP after a first minimum channel time, and may perform association with the non-target AP.

If the STA 400 receives the probe response frame 425 from the non-target AP 420, the STA 400 may perform an authentication and association procedure along with the non-target AP 420 that has sent the probe response frame 425 after the minimum channel time 440 expires. Alternatively, the STA 400 may wait until the maximum channel time 450, may receive an additional probe response frame if the additional probe response frame is transmitted, may perform processing on the received probe response frame after the maximum channel time 450 expires, and may perform an authentication and association procedure.

(5) If the STA 400 does not receive a probe response frame during the minimum channel time 440, the STA 400 may change a scanning channel to another channel and perform the aforementioned procedure of (1)-(4) again.

The various embodiments described with reference to FIG. 4 are disclosed in detail below with reference to FIGS. 6 to 8.

Figure 6:
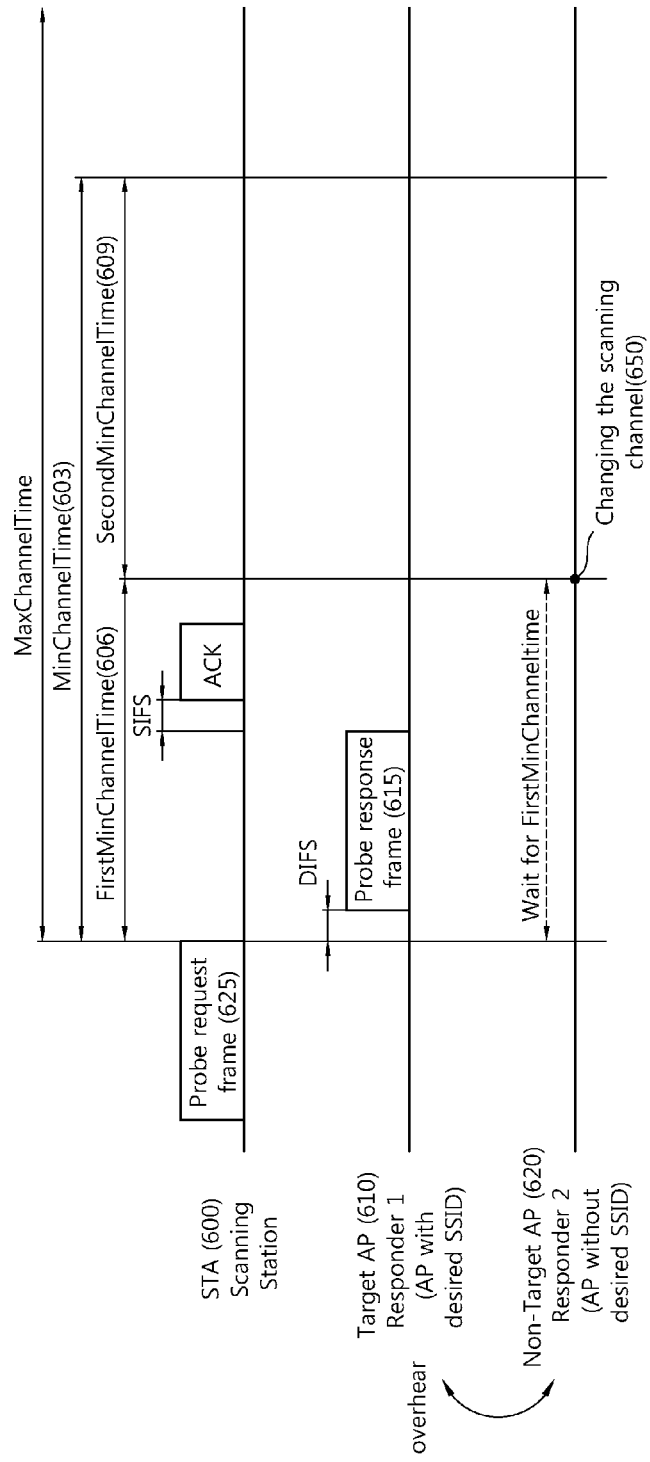
FIG. 6 is a conceptual diagram illustrating an active scanning method in accordance with an embodiment of the present invention.

FIG. 6 is a conceptual diagram illustrating an active scanning method in accordance with an embodiment of the present invention.

FIG. 6 discloses a method of preferentially receiving, by an STA 600, a probe response frame 615 from a target AP 610 within a first minimum channel time 606 and performing an authentication and association procedure along with the target AP 610.

Referring to FIG. 6, the STA 600 may send a probe request frame 625 including the SSID of the target AP 610. The target AP 610 that belong to APs that have received the probe request frame 625 and that corresponds to the SSID may send the probe response frame 615 in the first minimum channel time 606. The STA 600 may receive the probe response frame 615 from the target AP 610 and perform an authentication and association procedure along with the target AP 610.

A non-target AP 620 may overhear whether or not the probe response frame 615 is transmitted by the target AP 610. If the probe response frame 615 is transmitted by the target AP 610 based on a result of the overhearing, the non-target AP 620 may not send a probe response frame to the STA 600. If such a method is used, an unnecessary probe response frame can be prevented from being transmitted to the STA 600. Furthermore, the non-target AP 620 may send the probe response frame 615 to the STA 600 regardless of whether or not the probe response frame 615 is transmitted by the target AP 610.

A non-target AP may be aware of whether or not a probe response frame is transmitted by a target AP based on an interface between APs instead of overhearing the probe response frame.

If the STA 600 does not receive the probe response frame 615 in the first minimum channel time 606, the STA 600 may wait for a probe response frame, transmitted after the first minimum channel time 606, until a minimum channel time 603, or may change a scanning channel to another channel after the first minimum channel time 606 and perform scanning (650) in another channel.

Figure 7:
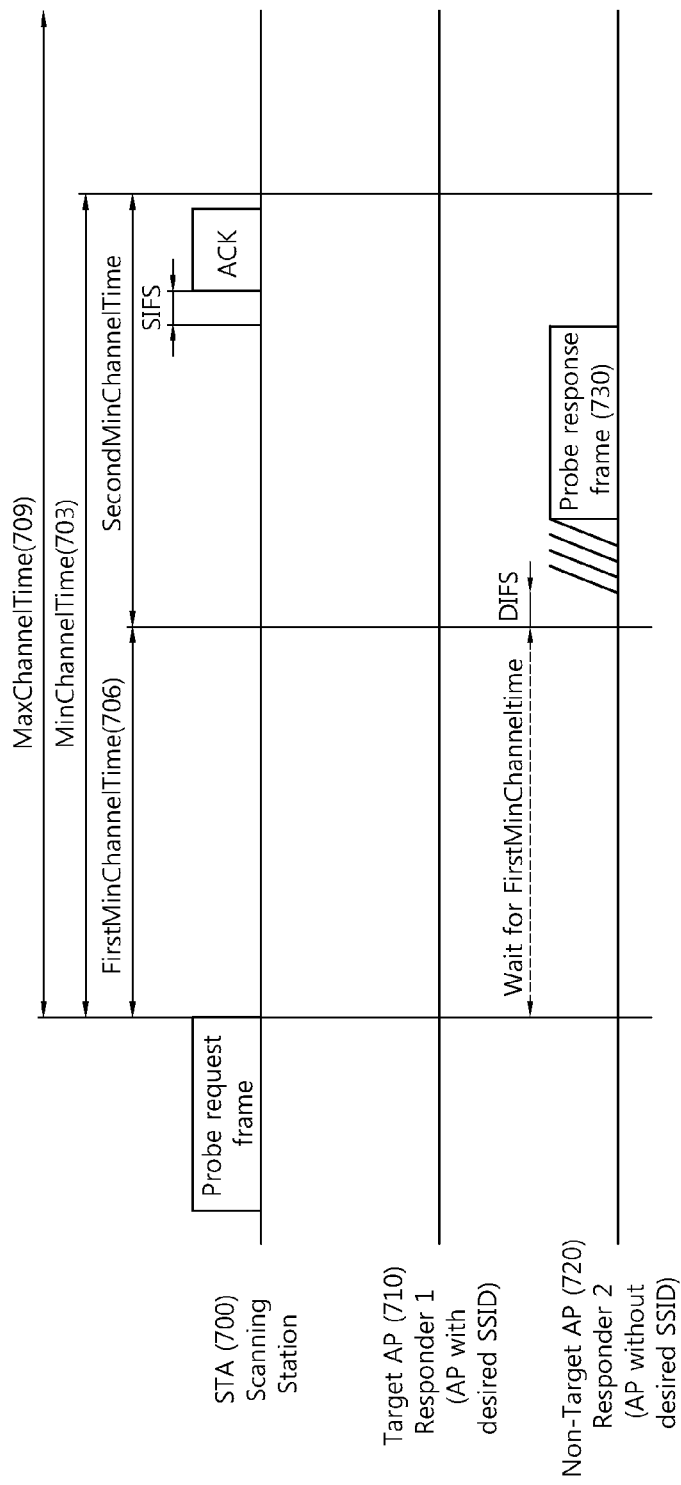
FIG. 7 is a conceptual diagram illustrating an active scanning method in accordance with an embodiment of the present invention.

FIG. 7 is a conceptual diagram illustrating an active scanning method in accordance with an embodiment of the present invention.

FIG. 7 discloses a method of performing, by an STA 700, an authentication and association procedure along with a non-target AP 720 if the STA 700 receives a probe response frame 730 from the non-target AP 720 within a minimum channel time 703 without receiving a probe response frame from a target AP 710 in a first minimum channel time 706.

Referring to FIG. 7, the STA 700 may receive the probe response frame 730 from the non-target AP 720 within the minimum channel time 703.

If the STA 700 receives the probe response frame 730 from the non-target AP 720 within the minimum channel time 703, the STA 700 may immediately perform an authentication and association procedure along with the non-target AP 720 that has sent the probe response frame 730, or may wait until a maximum channel time 709 and perform an authentication and association procedure along with an AP that has sent the probe response frame 730.

The target AP 710 may send a probe response frame within the minimum channel time 703 after the first minimum channel time 706 expires. In such a case, the STA 700 may preferentially process the probe response frame transmitted by the target AP 710 and perform an authentication and association procedure along with the target AP 710.

Figure 8:
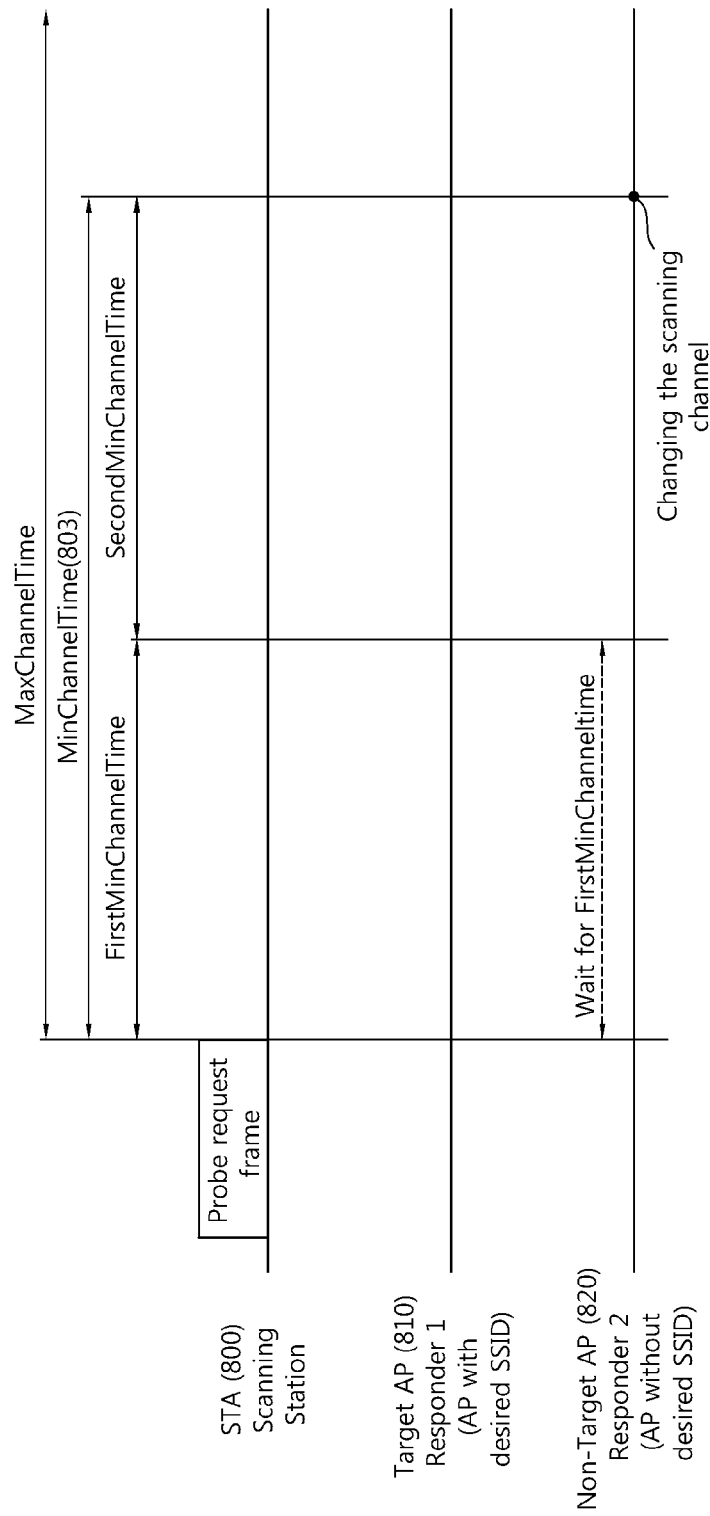
FIG. 8 is a conceptual diagram illustrating an active scanning method in accordance with an embodiment of the present invention.

FIG. 8 is a conceptual diagram illustrating an active scanning method in accordance with an embodiment of the present invention.

FIG. 8 discloses a case where an STA 800 has not received a probe response frame within a minimum channel time 803.

If the STA 800 has not received a probe response frame within the minimum channel time 803, the STA 800 may change a channel in which active scanning is performed to another channel, and may perform scanning.

FIG. 9 is a conceptual diagram illustrating an active scanning method in accordance with an embodiment of the present invention.

FIGS. 9(A) to 9(C) are conceptual diagrams illustrating a method of sending, by a target AP 910 and non-targets AP 920 and 930, a probe response frame if the target AP 910 and the non-target APs 920 and 930 are present in the coverage of the probe request frame of an STA 900.

Referring to FIG. 9(A), the STA 900 may send a probe request frame 905 that includes information capable of specifying an AP, such as the SSID of the target AP 910.

The probe request frame 905 may also be transmitted to the non-target APs 920 and 930 in addition to the target AP 910 specified through the SSID. The probe request frame 905 may include information related to a first minimum channel time. The target AP 910 and the non-target APs 920 and 930 may obtain information about timing at which a probe response frame has to be transmitted to the STA 900 based on the information related to the first minimum channel time that is included in the received probe request frame 905.

Referring to FIG. 9(B), only a target AP 910 may send a probe response frame 915 to an STA 900 during a first minimum channel time. The target AP 910 may send the probe response frame 915 to the STA 900 within the first minimum channel time.

If the STA 900 receives the probe response frame 915 from the target AP 910 within the first minimum channel time and immediately performs authentication and association along with the target AP 910, the STA 900 may not receive a probe response frame transmitted after the first minimum channel time. In another embodiment, in order to additionally overhear whether or not an AP that sends a probe response frame having a better SNR is present, the STA 900 may receive an additional probe response frame for a time that has been predetermined in order to perform authentication and association.

(3) After the first minimum channel time, non-target APs 920 and 930 send probe response frames 925 and 935.

After the first minimum channel time, the non-target APs 920 and 930 may send the probe response frames 925 and 935 to the STA 900. For example, if an STA is externally moved, an AP different from an AP previously registered with the STA needs to be used. In such a case, if the SSID of a specific AP is specified and a probe request frame is unicasted, there is a good possibility that the STA may not receive the probe response frame from the specified AP because the STA is unaware of the SSID of the external AP. In such a case, the STA 900 may receive the probe response frames 925 and 935 from the non-target APs 920 and 930 other than the target AP 910, and may perform authentication and association.

If the target AP 910 and the non-target APs 920 and 930 do not send the probe response frames 925 and 935 to the STA 900 during a minimum channel time, the STA 900 may change a channel in which scanning is performed to another channel.

In accordance with an embodiment of the present invention, if the target AP 910 sends the probe response frame 915, the non-target APs 920 and 930 may overhear the probe response frame 915 transmitted by the target AP 10 and not send the probe response frames 925 and 935.

Figure 10:
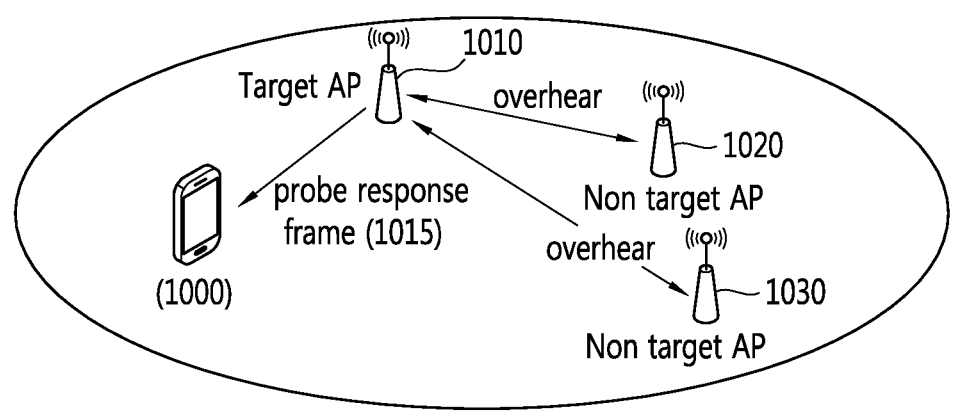
FIG. 10 is a conceptual diagram illustrating an active scanning method in accordance with an embodiment of the present invention.

FIG. 10 is a conceptual diagram illustrating an active scanning method in accordance with an embodiment of the present invention.

Referring to FIG. 10, if an STA 1000 receives a probe response frame 1015 from a target AP 1010 with which the STA 1000 wants to be associated, an additional time may be assigned so that the STA 1000 does not need to receive a probe response frame from the non-target APs 1020 and 1030. For example, in the case of an AP shared in a specific office, there is a possibility that the signal of the AP may be the greatest within the office. Accordingly, if the target AP 1010 sends the probe response frame 1015 and performs authentication and association, other non-target APs 1020 and 1030 may not need to send probe response frames.

The STA 1000 may send a specific probe request frame to the target AP 1010, and the target AP 1010 may send the probe response frame 1015 to the STA 1000 within a first minimum channel time. In this case, the non-target APs 1020 and 1030 may overhear the probe response frame 1015 transmitted by the target AP 1010. If the non-target APs 1020 and 1030 overhear the probe response frame 1015 transmitted by the target AP 1010, the non-target APs 1020 and 1030 may not send probe response frames even after the first minimum channel time. If such a method is used, an unnecessary operation of generating and sending, by the non-target APs 1020 and 1030, probe response frames can be reduced. A phenomenon in which the STA 1000 unnecessarily receives probe response frames can be prevented because the STA 1000 may not receive an unnecessary probe response frame.

Figure 11:
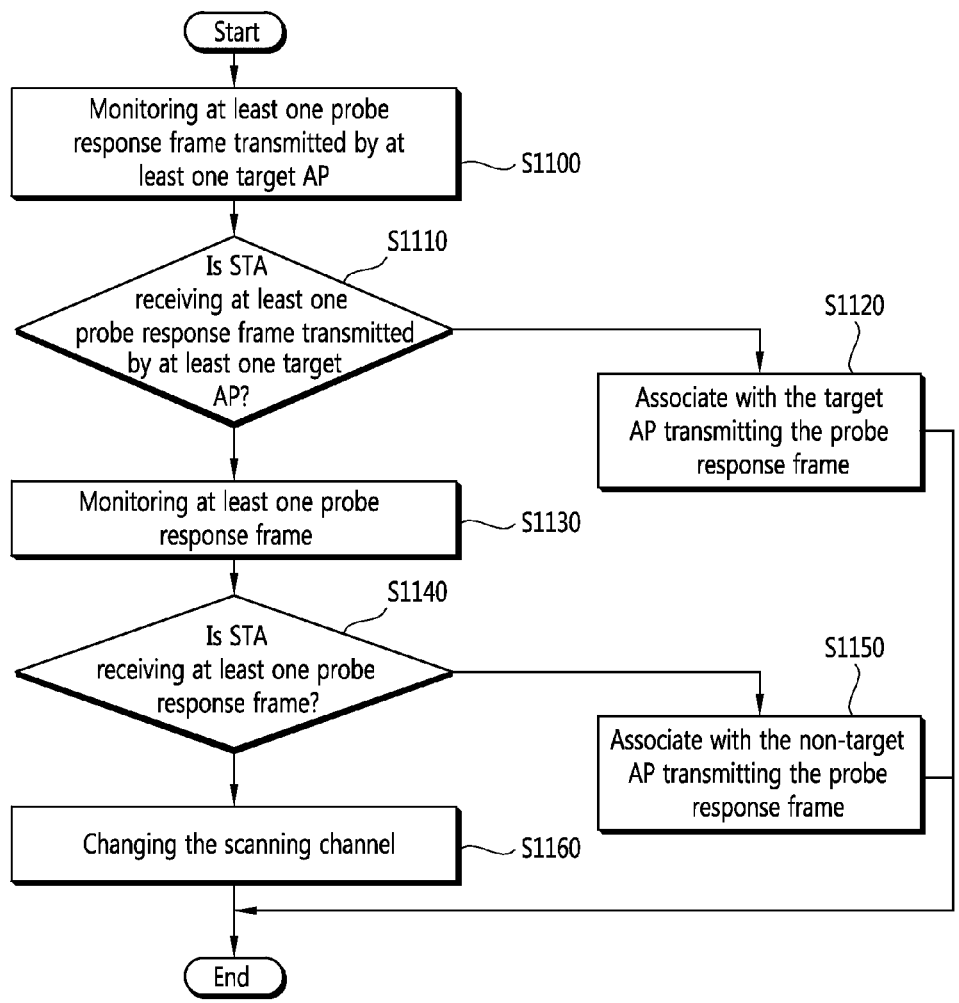
FIG. 11 is a flowchart illustrating a method of performing active scanning in accordance with an embodiment of the present invention.

FIG. 11 is a flowchart illustrating a method of performing active scanning in accordance with an embodiment of the present invention.

Referring to FIG. 11, an STA monitors whether or not a probe response frame transmitted by a target AP is received for the first minimum channel time (step S1100).

The STA may send a probe request frame including information about the target AP and information related to the first minimum channel time. The target AP and a non-target AP may receive the probe request frame transmitted by the STA. The target AP may preferentially send the probe response frame to the STA within the first minimum channel time, and the non-target AP may send a probe response frame to the STA after the first minimum channel time.

The STA may monitor only the probe response frame transmitted by the target AP in the first minimum channel time. Since the target AP preferentially sends the probe response frame and the non-target AP additionally sends the probe response frame in the remaining time interval, a phenomenon in which the probe response frames are crowded and received in a specific time interval can be prevented because the probe response frames can be distributed and received.

The STA determines whether or not the probe response frame transmitted by the target AP has been received in the first minimum channel time (step S1110). If, as a result of the determination, the probe response frame has been received from the target AP in the first minimum channel time, the STA processes the probe response frame transmitted by the target AP and performs an authentication and association process (step S1120).

The STA may receive the probe response frame from the target AP in the first minimum channel time. In such a case, the STA may perform an authentication and association step along with the target AP right before a maximum channel time expires. If such a method is used, the delay of active scanning, that is, an existing problem generated because a received probe response frame is processed after the probe response frame is received until the maximum channel time, can be reduced.

If the probe response frame is transmitted by the target AP, the non-target AP may overhear the probe response frame transmitted by the target AP. If the non-target AP has overheard the probe response frame transmitted by the target AP, the non-target AP may not send the probe response frame even after the first minimum channel time.

In an embodiment different from step S1120, if the probe response frame transmitted by the target AP is received in the first minimum channel time, the STA may additionally receive a probe response frame transmitted after the first minimum channel time, and may perform an authentication and association procedure.

The STA monitors whether or not a probe response frame is transmitted during a minimum channel time (step S1130).

The non-target AP may send the probe response frame to the STA even after the first minimum channel time. If the target AP does not send the probe response frame in the first minimum channel time, the STA may monitor the transmission of an additional probe response frame up to the minimum channel time.

The STA may monitor whether or not a probe response frame is transmitted during the minimum channel time (step S1140). If the probe response frame is transmitted within the minimum channel time, the STA may perform an authentication and association procedure based on the received probe response frame (step S1150).

If the probe response frame is transmitted within the minimum channel time, the STA may immediately perform the authentication and association procedure based on the received probe response frame. In another method, the STA may wait until the maximum channel time without performing an authentication and association procedure. If an additional probe response frame is transmitted within the maximum channel time, the STA may receive the additional probe response frame, may process a probe response frame received after the maximum channel time expires, and may perform an authentication and association procedure.

If a probe response frame is not received during the minimum channel time, the STA may change a scanning channel to another channel and perform active scanning (step S1160).

Figure 12:
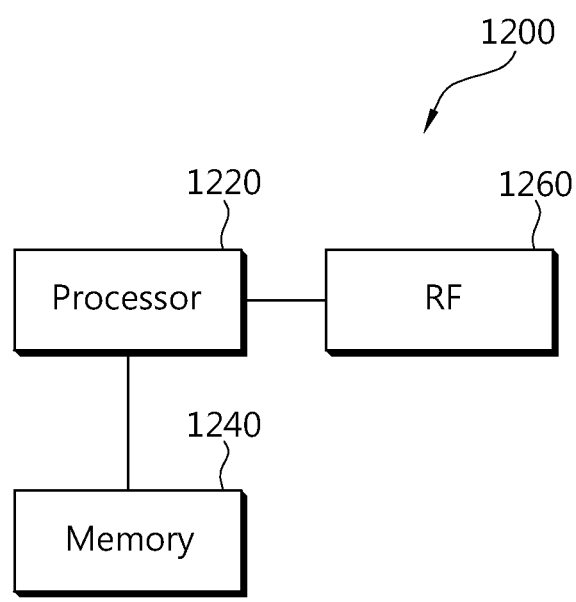
FIG. 12 is a block diagram illustrating a wireless apparatus to which an embodiment of the present invention may be applied.

FIG. 12 is a block diagram illustrating a wireless apparatus to which an embodiment of the present invention may be applied.

The wireless apparatus 1200 is an STA capable of implementing the aforementioned embodiments, and may be an AP or non-AP STA.

The wireless apparatus 1200 may include a processor 1220, memory 1240, and a Radio Frequency (RF) unit 1060.

The RF unit 1260 is connected to the processor 1220, and may send/receive radio signals.

The processor 1220 implements the functions, processes and/or methods proposed by the present invention. For example, the processor 1220 may be implemented to perform an active scanning method in accordance with an embodiment of the present invention. The processor 1220 may be implemented to determine whether an AP is a target AP or a non-target AP based on an AP identifier included in a received probe request frame. If the AP is a non-target AP, the processor 1220 may be implemented to perform back-off for the transmission of a probe response frame from a second interval after a first interval of a minimum channel interval expires. Furthermore, if the AP is a non-target AP, the processor 1220 may be implemented to overhear whether or not a probe response frame has been transmitted by the target AP during the first interval. If whether or not a probe response frame has been transmitted by the target AP is not overheard during the first interval, the processor 1220 may be implemented to send a probe response frame during the second interval. That is, the processor 1220 may be implemented to perform the aforementioned embodiments of the present invention.

The processor 1220 may include Application-Specific Integrated Circuits (ASICs), other chipsets, logic circuits, data processing devices and/or converters for mutually converting baseband signals and radio signals. The memory 1240 may include Read-Only Memory (ROM), Random Access Memory (RAM), flash memory, memory cards, storage media and/or other storage devices. The RF unit 1260 may include one or more antennas for sending and/or receiving radio signals.

When an embodiment is implemented in software, the aforementioned scheme may be implemented using a module (process or function) which performs the aforementioned functions. The module may be stored in the memory 1240 and executed by the processor 1220. The memory 1240 may be present inside or outside the processor 1220, and may be connected to the processor 1220 using a variety of well-known means.

What is claimed is:

1. An active scanning method in a wireless local area network (WLAN), comprising:
   receiving, by an Access Point (AP), a probe request frame including an AP identifier from a station (STA);
   determining whether or not the AP is a target AP or a non-target AP based on the AP identifier;
   performing a back-off procedure for a transmission of a probe response frame to the STA a first interval of a minimum channel interval when the AP is the target AP; and
   performing the back-off procedure for the transmission of the probe response frame to the STA in a second interval after the first interval expires when the AP is the non-target AP and the AP does not overhear a probe response frame transmitted by another AP which is the target AP during the first interval,
   wherein the AP is the target AP when the AP identifier indicates an identifier of the AP,
   wherein the AP is the non-target AP when the AP identifier does not indicate the identifier of the AP,
   wherein the minimum channel interval is a minimum time used to scan a channel, and
   wherein the minimum channel interval includes the first interval and the second interval.

2. The active scanning method of claim 1,
   wherein the probe request frame includes a first interval use field, and
   wherein the first interval use field includes information related to whether the first interval is used or not.

3. The active scanning method of claim 1,
   wherein the probe request frame further includes a first interval time field, and
   wherein the first interval time field includes information related to a period assigned as the first interval.

4. The active scanning method of claim 1, wherein information on the AP identifier is at least one of at least one Basic Service Set IDentification (BSSID), at least one Service Set IDentification (SSID), a mesh ID, a Homogeneous Extended Service Set IDentifier (HESSID), and a network ID.

5. An access point (AP) performing active scanning in a wireless local area network (WLAN), comprising:
   a radio frequency(RF) unit configured to transmit or receive radio signal;
   a processor operatively connected to the RF unit and configured to:
   receive a probe request frame including an AP identifier from a station(STA),
   determine whether or not the AP is a target AP or a non-target AP based on the AP identifier
   perform a back-off procedure for a transmission of a probe response frame to the STA in a first interval of a minimum channel interval when the AP is the target AP, and
   perform the back-off procedure for the transmission of the probe response frame to the STA in a second interval after the first interval expires when the AP is the non-target AP and the AP does not overhear a probe response frame transmitted by another AP which is the target AP during the first interval,
   wherein the AP is the target AP when the AP identifier indicates an identifier of the AP,
   wherein the AP is the non-target AP when the AP identifier does not indicate the identifier of the AP,
   wherein the minimum channel interval is a minimum time used to scan each channel, and
   wherein the minimum channel interval includes the first interval and the second interval.

6. The AP of claim 5,
   wherein the probe request frame includes a first interval use field, and
   wherein the first interval use field includes information related to whether the first interval is used or not.

7. The AP of claim 5,
   wherein the probe request frame further includes a first interval time field, and
   wherein the first interval time field includes information related to a period assigned as the first interval.

8. The AP of claim 5, wherein information on the AP identifier is at least one of at least one Basic Service Set IDentification (BSSID), at least one Service Set IDentification (SSID), a mesh ID, a Homogeneous Extended Service Set IDentifer (HESSID), and a network ID.

9. The method of claim 1, performing, by the AP, an authentication procedure and an association procedure with the STA immediately after transmitting the probe response frame to the STA in the first interval when the AP is the target AP.

10. The AP of claim 5, wherein the processor is configured to perform an authentication procedure and an association procedure with the STA immediately after transmitting the probe response frame to the STA in the first interval when the AP is the target AP.

\* \* \* \* \*